United States Patent [19]

Ono et al.

[11] Patent Number: 4,550,049
[45] Date of Patent: Oct. 29, 1985

[54] LAMINATED FILM AND MAGNETIC RECORDING MEDIUM MADE THEREWITH

[75] Inventors: Masaaki Ono, Omihachiman; Yasuki Miura, Otsu; Masahiko Motegi, Hikone; Kazuo Okabe, Shiga, all of Japan

[73] Assignee: Toray Industries, Inc., Tokyo, Japan

[21] Appl. No.: 473,449

[22] Filed: Mar. 9, 1983

[30] Foreign Application Priority Data

Mar. 10, 1982 [JP] Japan .............................. 57-36341
Mar. 11, 1982 [JP] Japan .............................. 57-38763

[51] Int. Cl.$^4$ ........................... G11B 5/72; B32B 3/00
[52] U.S. Cl. .................................. 428/141; 428/145; 428/147; 428/149; 428/152; 428/201; 428/206; 428/447; 428/480; 428/483; 428/484; 428/694; 428/695; 428/900
[58] Field of Search ............... 428/141, 145, 147, 149, 428/152, 447, 480, 483, 484, 692, 694, 695, 201, 206, 900; 528/275, 286

[56] References Cited

U.S. PATENT DOCUMENTS

| | | | |
|---|---|---|---|
| 3,656,996 | 4/1972 | Van Paesschen et al. | 428/484 |
| 3,821,156 | 6/1974 | Farrar | 524/425 |
| 3,993,846 | 11/1976 | Higuchi et al. | 428/695 |
| 4,007,314 | 2/1977 | Higuchi et al. | 428/695 |
| 4,138,386 | 2/1979 | Motegi et al. | 524/432 |
| 4,171,406 | 10/1979 | Yamaguchi et al. | 428/447 |
| 4,233,352 | 11/1980 | Ono et al. | 428/141 |
| 4,348,446 | 9/1982 | Mitsuishi et al. | 428/694 |
| 4,388,360 | 6/1983 | Miyoshi et al. | 428/695 |
| 4,390,601 | 6/1983 | Ono et al. | 428/484 |
| 4,394,420 | 7/1983 | Tamai et al. | 428/900 |
| 4,444,842 | 4/1984 | Yamaguchi et al. | 428/695 |

FOREIGN PATENT DOCUMENTS

| | | |
|---|---|---|
| 115663 | 12/1973 | Japan . |
| 75249 | 9/1974 | Japan . |
| 51733 | 9/1974 | Japan . |
| 2087302 | 5/1982 | United Kingdom . |

*Primary Examiner*—Ellis P. Robinson
*Assistant Examiner*—William M. Atkinson
*Attorney, Agent, or Firm*—Austin R. Miller

[57] ABSTRACT

A laminated film comprising (A) a layer composed of a thermoplastic resin and (B) a layer composed of a thermoplastic resin containing fine particles therein, wherein a discontinuous skin having a height of 50 to 1,000 Å is formed on the outer surface of the layer (A) and the outer surface of the layer (B) has a surface Ra value of 0.005 to 0.040μ. The laminated film is very valuable as a base film of a magnetic recording tape having a ferromagnetic metal thin film formed on the surface of the layer (A), especially a video tape, because it has good running properties and is excellent in electromagnetic transformation performance.

27 Claims, 12 Drawing Figures

LAMINATED FILM AND MAGNETIC RECORDING MEDIUM MADE THEREWITH

BACKGROUND OF THE INVENTION (1) Field of the Invention

This invention relates to a laminated thermoplastic film. More particularly, it relates to a base film suitable for a super-high density magnetic recording medium having very good running properties.

(2) Description of the Prior Art

The increase in recording density in magnetic recording media has led to a demand for increased surface smoothness in the thermoplastic resin film used for the recording media. On the other hand, the need to improve operation adaptability at the film-forming step or the magnetic tape-preparing step has led to a demand for good slip characteristics for the surface of the film and has made the slip properties of the magnetic tape crucial. Thus, it is required that a thermoplastic resin base film suitable for a magnetic recording medium have excellent smoothness and good slip characteristics.

As means for satisfying these requirements, there has been adopted a method in which fine particles are incorporated in a starting polymeric material for formation of a smooth film. According to this conventional technique, however, improvement of either the smoothness or slip characteristics results in degradation of the other. It has heretofore been impossible to improve both properties simultaneously.

A conventional magnetic recording tape of the coating type, is prepared by coating a base film with a magnetic paint comprising a magnetic powder and an organic polymer binder. The coating layer has a relatively large thickness, i.e., ordinarily 3 to 6µ. Accordingly, convexities and concavities sufficient to cause drastic reduction of the electromagnetic performances seldom occur in the magnetic layer. Therefore, in a conventional base film for a magnetic recording medium, a method has been employed wherein finely divided particles are incorporated in the starting polymeric material or internal particles are formed in the starting polymeric material from the polymerization catalyst residue, whereby slip characteristics are imparted to the film.

However, this coating type magnetic recording medium does not meet recent requirements for superhigh magnetic recording density. Accordingly, a metallized film tape having a highly magnetic, thin metal surface layer formed by vacuum evaporation or sputtering without the use of a binder has become popular as a super-high recording density tape instead of the magnetic recording medium of the coating type.

The thickness of the magnetic metal layer of the above-mentioned metallized film tape is usually 0.05 to 0.2µ, much thinner than that in the magnetic tape of the coating type. Therefore, the surface configuration of the base film used is completely reproduced on the surface of the metallized film tape. Accordingly, if the surface roughness of the base film is large, the electromagnetic performance of the metallized film video tape is extremely reduced. In fact, if a metallized film video tape formed from a finely divided particle-incorporated base film is used in a video tape recorder (VTR), no image is reproduced. Therefore, this tape cannot be used as a video tape.

In view of the electromagnetic performance, a base film having quite a smooth surface is preferred. Practically, however, a problem arises with such a smooth surface film. Specifically, a vacuum-deposited metal film formed on a base film having a smooth surface is inferior in surface slip characteristics. Therefore, unless, for example, a protecting film layer is formed thereon, many scratches are inevitably produced on the surface of the vacuum-deposited metal film by contact with guide pins, heads, and the like in the tape-forming process after the vacuum evaporation or during the use thereof in a VTR.

As a base film for the high density magnetic recording medium in which the foregoing defect is eliminated, reduction of the electromagnetic performance is minimized, and the slip characteristics are improved, we previously proposed, in U.S. Pat. No. 4,233,352, a polyester film having on at least one surface thereof a discontinuous film formed of worm-like nodules composed of a mixture of a water-soluble polymer and a polysiloxane or styrene-butadiene rubber. The above-mentioned problem has been substantially solved by this proposal and a good image can be reproduced even when a metallized film is used as a video tape if the metallized layer is formed on the surface on which the discontinuous film is shaped.

In U.S. Pat. No. 4,233,352, it is taught that the running property is improved by forming a coating layer on a smooth surface. However, it was found that, under severe running conditions, for example, when the frequency of repeated use is extremely increased, the running properties and durability are inferior to those of an ordinary fine particle-containing film. Accordingly, research was conducted with a view to eliminating this defect. We found that this defect can be eliminated in a film having a specific discontinuous film formed on one surface, on which the magnetic recording layer is to be formed, and having on the opposite surface a specific surface roughness due to fine particles having a regulated size.

In a base film wound in the form of a roll, the configuration of the coarse surface is transferred to the contacted smooth surface to degrade the smoothness of the smooth surface. When a vacuum-deposited tape is prepared by running the film on a smooth cooling can, the front smooth surface is influenced by the coarse surface, whereby the smoothness is degraded. Moreover, when the formed magnetic tape is wound in the form of a roll, the configuration of the coarse surface is transferred to the smooth surface, resulting in reduction of the smoothness.

SUMMARY OF THE INVENTION

It is a primary object of the present invention to provide a laminated film suitable for a high density magnetic recording medium, on one surface of which a magnetic thin film can be formed, which film is excellent in scratch resistance and electromagnetic transformation performance, and the other surface of which has good sliding and running properties when in contact with a metal guide rod, and hence, is excellent in durability and does not cause degradation of the configuration of the magnetic thin film surface due to transfer of the configuration of the running surface.

Another object of the present invention is to provide a laminated film suitable for a high density magnetic recording medium, one surface of which has a very smooth vacuum-deposited magnetic metal thin film layer having good sliding properties and good scratch resistance can be formed and the other surface of which is excellent in the running properties and durability, and transfer of the configuration of the running surface in the wound state does not occur.

Still another object of the present invention is to provide a super-high density magnetic recording medium having a ferromagnetic metal thin film layer excellent in slip characteristics, scratch resistance and electromagnetic performance, which is formed on the surface, and having very good running properties.

A further object of the present invention is to provide a video tape of the metallized film type suitable for a small video tape recorder (VTR) and a base film therefor.

More specifically, in accordance with the present invention, there is provided a laminated film comprising (A) a layer composed of a thermoplastic resin and (B) a layer of a thermoplastic resin containing fine particles therein, wherein the outer surface of the layer (A) has a discontinuous skin having a height of 50 to 1,000Å and the outer surface of the layer (B) has a roughness, expressed as the Ra value, of 0.005 to 0.040μ.

The outer surface of the layer (B) may be an ordinary protrusion type surface having protrusions formed on a flat plane, or it may have a plurality of depressions and a plurality of protrusions which are formed in a configuration such that at least one protrusion exists within each depression or at least one protrusion exists in the area where two or more depressions are contiguous to each other, the depressions preferably having an area fraction of from $1 \times 10^{-3}$ to $6 \times 10^{-1}$.

A covering layer (C) comprising a lubricant may be formed on the outer surface of the layer (B), in order to further improve the running properties. This covering layer may be a continuous film layer comprising a silicone resin, a surface active agent, and a silane coupling agent optionally together with a wax, or a discontinuous film layer formed of worm-like nodules, which comprises a silicone resin, a silane coupling agent, and a water-soluble high polymer optionally together with a wax.

DESCRIPTION OF THE PREFERRED EMBODIMENTS

By the term "thermoplastic resin" used in the present invention is meant thermoplastic polymers such as polyesters, polyamides, polycarbonates and polypropylenes. Among these polymers, polyesters are preferred because they are excellent in both mechanical and thermal characteristics.

Any polyester composed mainly of linear polyesters may be used in the present invention. As typical examples, there can be mentioned polyethylene terephthalate, polytetramethylene terephthalate, poly-1,4-cyclohexylenedimethylene terephthalate, polyethylene-2,6-naphthalene dicarboxylate and polyethylene-p-hydroxybenzoate. Of course, these polyesters may be either homopolyesters or copolyesters. As the comonomer component used for the copolyester, there can be mentioned, for example, diol components such as diethylene glycol, propylene glycol, p-xylylene glycol and 1,4-cyclohexane dimethanol; dicarboxylic acid components such as adipic acid, sebacic acid, phthalic acid, isophthalic acid, 2,6-naphthalene dicarboxylic acid and 5-sodium sulfoisophthalate; polyfunctional dicarboxylic acid components such as trimellitic acid and pyromellitic acid; and p-hydroxyethoxybenzoic acid. In the case of a copolyester, the amount of the comonomer component is controlled to no more than 20 mole %.

The layer (A) composed of a thermoplastic resin is a layer containing no fine particles having a particle size larger than 0.5μ in the thermoplastic resin, preferably a layer substantially free of fine particles. The layer (B) of a thermoplastic resin is a layer containing fine particles. It is preferred that the layers (A) and (B) be monoaxially or more preferably biaxially oriented.

The fine particles are those formed by reaction of the residue of a polymerization catalyst for formation of a thermoplastic resin with monomers or oligomers, as disclosed in U.S. Pat. No. 4,138,386 and 4,067,855, for example, in the case of a polyester resin, fine particles of a polymerinsoluble composition formed by reaction of a catalyst residue containing Ca, Si, Mn, Mg, Sb, Ge, P, Li, K, Na, or the like with monomers or oligomers during the polyester-forming polymerization reaction, and/or inactive inorganic particles of aluminum oxide, silicon oxide, barium sulfate and calcium carbonate, though fine particles that can be used in the present invention are not limited to those exemplified above.

It is preferred that the particle size of these fine particles be 0.5 to 5μ, especially 1 to 3μ, and that the amount of the fine particles be 0.01% to 1.0% by weight, especially 0.02% to 0.5% by weight.

The roughness of the outer surface of the layer (A) composed of the thermoplastic resin is less than $0.005\mu$ as expressed as the Ra value at a cut-off value of 0.25 mm (as determined according to the method of DIN 4768). The outer surface of the layer (A) comprises discontinuous skin having a height of 50 to 1,000Å formed thereon. The composition of this discontinuous skin is not particularly critical, so far as a discontinuous skin as specified in the present invention is formed. As a typical example, there can be mentioned a composition comprising a silicone resin, a silane coupling agent, and a water-soluble polymer, as described hereinafter. It is preferred that the silicone resin/silane coupling agent-/water-soluble polymer weight ratio in this composition be in the range of (10–50)/(5–150)/(10–200).

Figure 1:
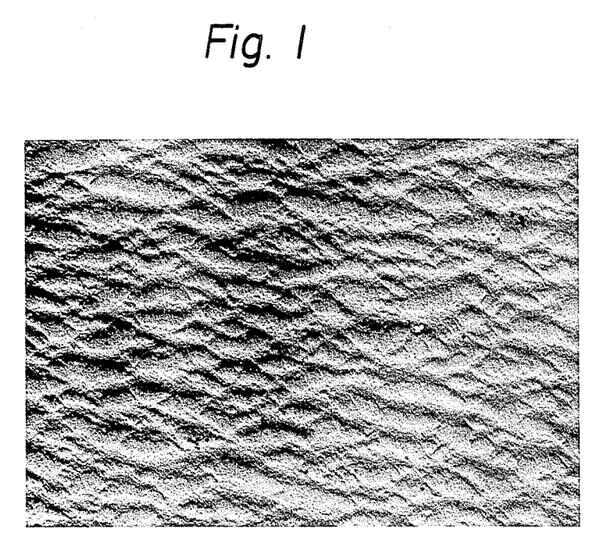
FIG. 1 is an electron photomicrograph of the discontinuous skin formed on the outer surface of the layer (A) of the laminated film of the present invention.
Figure 2:
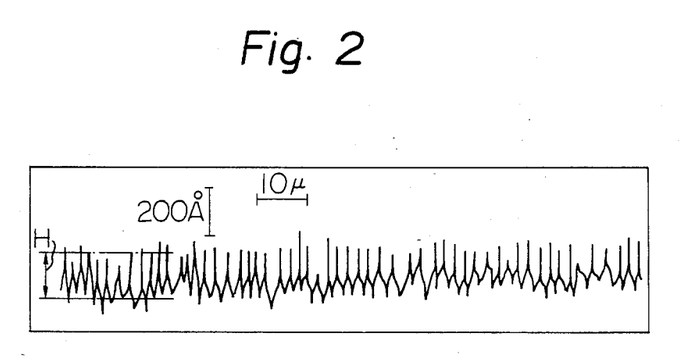
FIG. 2 shows a curve of the surface height of the discontinuous skin obtained by measuring the height by a stylus type surface roughness tester, in which H stands for the height of the skin, which is expressed by the distance between the mean position of 10 highest peaks in the curve and the mean position of 10 lowest valleys in the curve.

In the discontinuous skin-formed surface (hereinafter referred to as "surface A"), a discontinuous skin having a structure typically shown in the electron photomicrograph (5,000 magnifications) of FIG. 1 occupies 10% to 90% of the total area. The height of the skin means the distance H between the mean height of peaks and the mean depth of troughs in the surface roughness curve as shown in FIG. 2, which is obtained by measuring the surface A by using a stylus type surface roughness tester at a cut-off value of 0.08 mm at 500,000 magnification in the vertical direction. This height is 50 to 1,000Å, Preferably 80 to 300Å. If the height of the skin is within this range, because of the presence of this discontinuous skin, formation of scratches on the surface A is prevented in the process for preparing a magnetic tape from the base film.

Preferred examples of the silicone resin, silane coupling agent and water-soluble polymer will now be described.

(a) Silicon Resin [hereinafter referred to as "component (a) "]:

Component (a) has a molecular weight of 30,000 to 300,000. As a preferred example, there can be mentioned a silicone compound comprising a chain represented by the following formula:

wherein $R_1$ is $CH_3$, $C_6H_5$ or H, $R_2$ is $CH_3$, $C_6H_5$, H or a functional group such as an epoxy, amino or hydroxyl group, and n is an integer of 100 to 7,000 giving the above-mentioned molecular weight by $R_1$ and $R_2$, and having epoxy, amino, hydroxyl or other functional terminal groups at the molecule ends. In the present invention, the silicone compound should not necessarily be a homopolymer. A copolymer or a mixture of several homopolymers may be used. The molecular weight of the silicone resin is preferably in the range of from 30,000 to 300,000. If the molecular weight is lower than 30,000, the discontinuous skin becomes too soft. If the molecular weight is higher than 300,000, the discontinuous skin becomes brittle.

(b) Silane Coupling Agent [hereinafter referred to as "component (b) "]:

Component (b) is used for providing bondability between the components and the plastic base film. Component (b) is an organic silicon monomer containing at least two different reactive groups in the molecule. One of the reactive groups is selected from the methoxy, ethoxy and silanol groups and the other reactive group is selected from the vinyl, epoxy, methacrylic, amino, and mercapto groups. Reactive groups capable of coupling with side chain groups and terminal groups of the silicone resin are selected. A mono- or di-organoalkoxysilane is ordinarily used as the silane coupling agent. For example, there may be used vinyltrichlorosilane, vinyltriethoxysilane, vinyl-tris($\beta$-methoxyethoxy)silane, $\gamma$-glycidoxypropyltrimethoxysilane, $\gamma$-methaoryloxypropylmethoxysilane, N-$\beta$-(aminoethyl)-$\gamma$-aminopropyltrimethoxysilane, N-$\beta$-(aminoethyl)-$\gamma$-aminopropylmethyldimethoxysilane, $\gamma$-chloropropyltrimethoxysilane, $\gamma$-mercaptopropyltrimethoxysilane and $\gamma$-aminopropyltriethoxysilane.

If the amount of component (b) is too small, the bonding between the components and the plastic base film is insufficient. If the amount of component (b) is too large, the discontinuous skin is brittle and the durability is reduced.

(c) Water-Soluble Polymer [hereinafter referred to as "component (c) "]:

A water-soluble polymer having a molecular weight of 10,000 to 2,000,000, preferably 100,000 to 1,000,000, is used as component (c). If the molecular weight is lower than 10,000, the discontinuous skin becomes too soft, and retention of the structure becomes difficult and the durability is reduced. If the molecular weight exceeds 2,000,000, the discontinuous skin becomes too hard and brittle, and the durability is reduced. As the water-soluble polymer, there can be mentioned polyvinyl alcohol, tragacanth gum, gum arabic, casein, gelatin, methyl cellulose, hydroxyethyl cellulose and carboxymethyl cellulose. Among these water-soluble polymers, there are preferably used cellulose type water-soluble polymers such as methyl cellulose, hydroxyethyl cellulose and carboxymethyl cellulose.

A magnetic layer, preferably a thin film of a ferromagnetic substance, may be formed on the surface A of the laminated film of the present invention. More specifically, a ferromagnetic substance such as Fe, Co, Ni, an alloy of two or more of these metals, or an alloy of such a metal with other non-magnetic material is formed on the surface A in the form of a thin film having a thickness of 500 to 2,000Å by vacuum evaporation, sputtering or plating, where a magnetic recording medium is obtained.

Where a magnetic thin film is formed on the above-mentioned discontinuous skin surface, the surface of the magnetic thin film has good sliding properties, and occurrence of the sticking phenomenon or formation of scratches due to contact with the rotary head drum during the actual running in a VTR is prevented. Furthermore, since the height of the structure of the discontinuous skin is not larger than 1,000Å, the electromagnetic transformation performance of a magnetic tape obtained by forming a ferromagnetic thin film on the surface A is very excellent.

Figure 3:
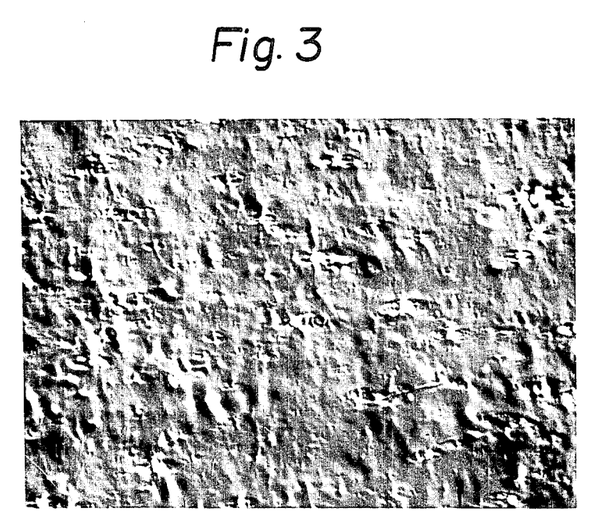
FIG. 3 is a photomicrograph of protrusions which are formed, together with depressions, on the outer surface of the layer (B) of the laminated film of the present invention, obtained by using a differential interference microscope.

The outer surface of the layer (B) of the laminated film of the present invention means the surface of the layer (B) which is not contiguous to the layer (A). This is a surface having ordinary protrusions formed on the flat face or a surface having a plurality of depressions and a plurality of protrusions in a configuration such that at least one protrusion exists within each depression or at least one protrusion exists in the area where two or more depressions are contiguous to each other, as typically shown in the photomicrograph (1,000 magnifications) of FIG. 3 obtained by using a differential interference microscope. With the latter surface, it is preferred that the area fraction of the depressions be in the range of from $1 \times 10^{-3}$ to $6 \times 10^{-1}$. By the term "area fraction of the depressions" is meant the ratio of the area of the depressions to the area of the visually observed field. The area fraction of depressions is calculated from the following equation:

$$\text{Area fraction} = \left( \sum_i niDi \right) / S$$

wherein Di is an area of a certain depression and ni is the number of depressions having an area of Di, and is an area of the visually observed field.

The surface having these protrusions and depressions will now be described with reference to FIGS. 5 through 8.

Figure 5A:
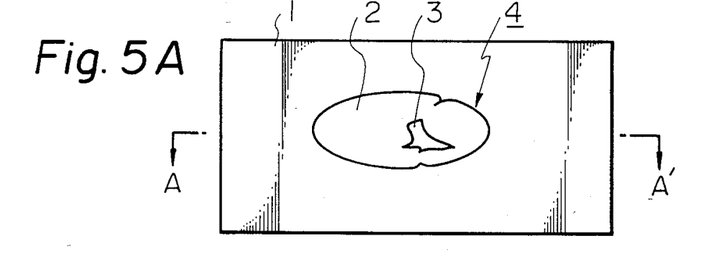
FIG. 5A is a diagrammatic plane view illustrating a depression having a protrusion therein and FIG. 5B is a diagrammatic cross-sectional view of the depression cut along the line A—A' in FIG. 5A.
Figure 5B:
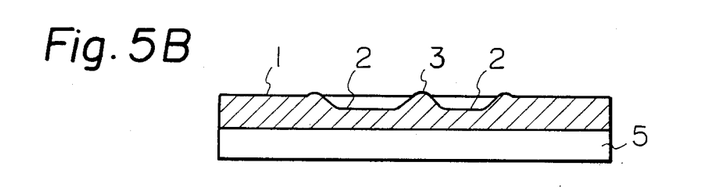
Figure 6A:
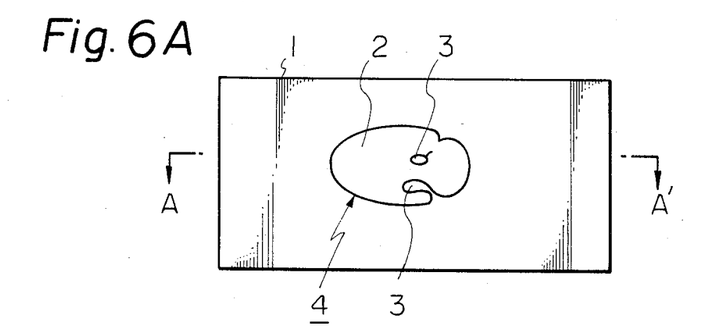
FIG. 6A is a diagrammatic plane view illustrating a depression having protrusions therein and FIG. 6B is a diagrammatic cross-sectional view of the depression cut along the line A—A' in FIG. 6A.
Figure 6B:
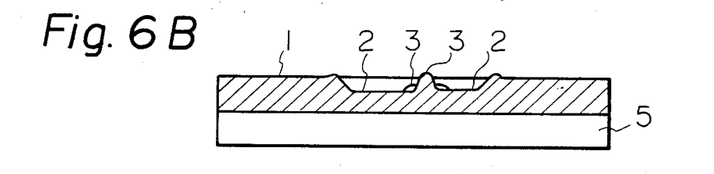

Referring to FIGS. 5A and 5B and FIGS. 6A and 6B, a plurality of depression-protrusion combinations 4 are formed on the surface of the layer (B). Each combination comprises a depression 2 and one or more protrusions 3 present in the depression. The number of the protrusion 3 present in each depression may be one as shown in FIGS. 5A and 5B or plural as shown in FIGS. 6A and 6B. The shape of the depression 2 is not particularly critical. The depression may be elliptical (see FIG. 6A), long elliptical (see FIG. 5A), or gourd-shaped. The protrusion 3 may be present in any position within each depression 2. Reference numeral 5 represents the layer (A) of the laminated film.

Figure 7A:
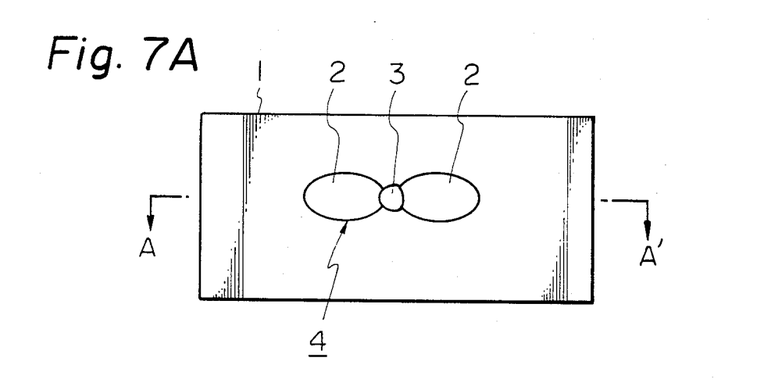
FIG. 7A is a diagrammatic plane view illustrating depressions having a protrusion in the area where the depressions are contiguous to each other and FIG. 7B is a diagrammatic cross-sectional view of the depressions cut along the line A—A' in FIG. 7A.
Figure 7B:
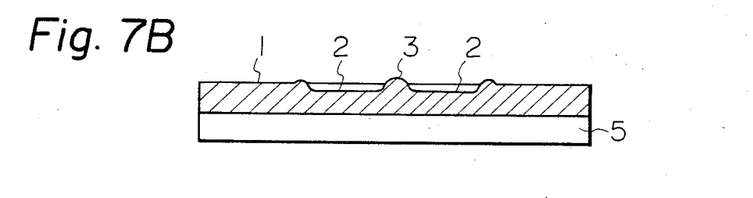
Figure 8:
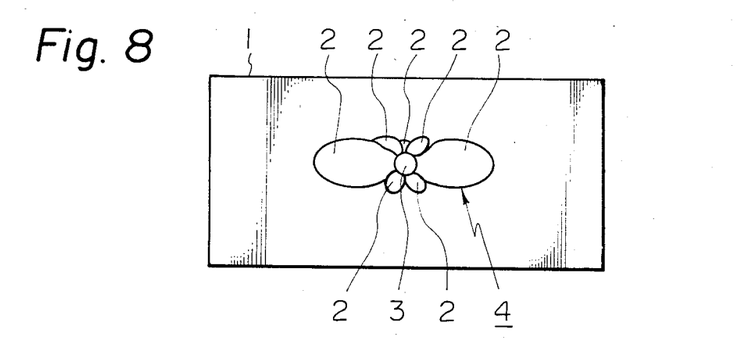
FIG. 8 is a diagrammatic plane view illustrating depressions having a protrusion in the area where the depressions are contiguous to each other.

Referring to FIGS. 7A and 7B and FIG. 8, one or more protrusions 3 are formed in the area where two or more depressions are contiguous to each other. More specifically, a protrusion may occupy the area where two elliptical depressions 2 are contiguous to each other as shown in FIG. 7A, or a protrusion 3 may occupy the area where seven depressions are contiguous to one another as shown in FIG. 8.

The roughness of the surface having these depressions and protrusions formed thereon is 0.005 to 0.040μ, preferably 0.005 to 0.030μ, as expressed as the Ra value at a cut-off value of 0.25 mm. If the Ra value is smaller than the lower limit, the running properties of this surface on a metal roll and a guide rod is degraded. Namely, the running property and durability are degraded. If the Ra value is larger than the upper limit, the surface roughness is increased. When the base film is wound in the form of a roll or the magnetic tape is wound on a reel in the tape-manufacturing process, the configuration of this surface is transferred to the discontinuous skin-formed surface, resulting in reduction of the smoothness of the discontinuous skin-formed surface and reduction of the electromagnetic transformation performance.

If it is desired to further increase the running properties and durability, it is preferable to form a covering layer composed mainly of a lubricant described below on the outer surface of the layer (B) during or after the film-manufacturing process.

Typical examples of the lubricant used in the present invention are as follows.

(d) Silicone Resin [hereinafter referred to as "component (d) "]:

The same silicone resins as mentioned with respect to component (a) may be used. It is preferred that the molecular weight of component (d) be in the range of from 30,000 to 300,000. If the molecular weight of component (d) is lower than 30,000, the covering layer becomes too soft. If the molecular weight of component (d) exceeds 300,000, the covering layer becomes brittle.

(e) Surface Active Agent [hereinafter referred to as "component (e)"]:

Use of anionic surface active agents, cationic surface active agents, and nonionic surface active agents as component (e) is preferred. The HLB value of component (e) is preferably in the range of from 5 to 50. Component (e) is used for homogenization of the components. If the amount of component (e) is too small, the homogeneity of the mixture of the components is decreased. If the amount of component (e) is too large, the durability of the covering layer is decreased.

(f) Silane Coupling Agent [hereinafter referred to as "component (f)"]:

Component (f) is used for providing bondability between the components and the plastic base film. Silane coupling agents mentioned above with respect to component (b) may be used. If the amount of component (f) is too small, the bonding between the components and the plastic base film becomes insufficient. If the amount of the component (f) is too large, the covering layer becomes brittle and the durability is reduced.

(g) Water-Soluble Polymer [hereinafter referred to as "component (g)"]:

The molecular weight of component (g) is 10,000 to 2,000,000, preferably 100,000 to 1,000,000. If the molecular weight is lower than 10,000, the film becomes too soft, retention of the structure is difficult and the durability is degraded. If the molecular weight is higher than 2,000,000, the film becomes too hard and brittle and the durability is degraded. Use of water-soluble polymers mentioned above with respect to component (c) is preferred.

(h) Wax [hereinafter referred to as "component (h)"]:

As component (h), there may be used waxes such as insect wax, spermaceti, carnauba wax, and beeswax.

The covering layer formed on the outer surface of layer (B) of the laminated film is classified into the entire surface uniform covering layer and the discontinuous covering layer formed of worm-like nodules according to the kind of the lubricant selected and used.

As the lubricant to be used for formation of the entire surface uniform covering layer, there is used a composition comprising the above-mentioned silicone resin (d), surface active agent (e), silane coupling agent (f), and, preferably, wax (h).

In this case, it is preferred that the silicone resin (d)/surface active agent (e)/silane coupling agent (f)/wax (h) weight ratio be in the range of (10–100)/(5–20)/(5–100)/(0–200). The thickness of the covering layer is 1 to 1,000 mg/m², preferably 2 to 500 mg/m², as solids. Both components (d) and (h) are lubricants. If the amount of component (d) is too large or too small, the durability is reduced. If the amount of the wax (h) is too large, the durability is also reduced.

As the lubricant to be used for formation of the discontinuous covering layer formed of worm-like nodules, there is used a composition comprising the above-mentioned silicone resin (d), silane coupling agent, (f) water-soluble polymer (g), and, preferably, wax (h).

In this case, it is preferred that the silicone resin (d)/silane coupling agent (f)/water-soluble polymer (g)/wax (h) weight ratio be in the range of (10–100)/(5–100)/ (10–200)/(0–200). The thickness of the covering layer is 1 to 1,000 mg/m$^2$, preferably 2 to 500 mg/m$^2$, as solids.

Components (d) and (h) are lubricating components. If the amount of component (d) is too large or too small, the durability is reduced. If the amount of component (h) is too large, the durability is also reduced. Component (g) is a component for forming the covering structure of worm-like nodules. If the amount of component (g) is too small, retention of this covering structure becomes difficult. If the amount of component (g) is too large, the durability is reduced. Component (f) is used for providing bondability between the components and the plastic base film. If the amount of component (f) is too small, the bonding is insufficient and the durability is reduced. If the amount of component (f) is too large, the covering layer becomes brittle and the durability is reduced.

Figure 4:
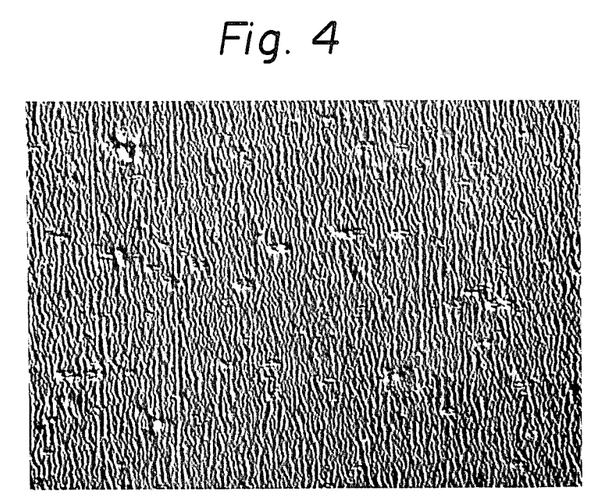
FIG. 4 is a photomicrograph of an easily-slipping film layer formed of worm-like nodules on the outer surface of the layer (B) of the laminated film of the present invention, obtained by using a differential interference microscope.
Figure 9:
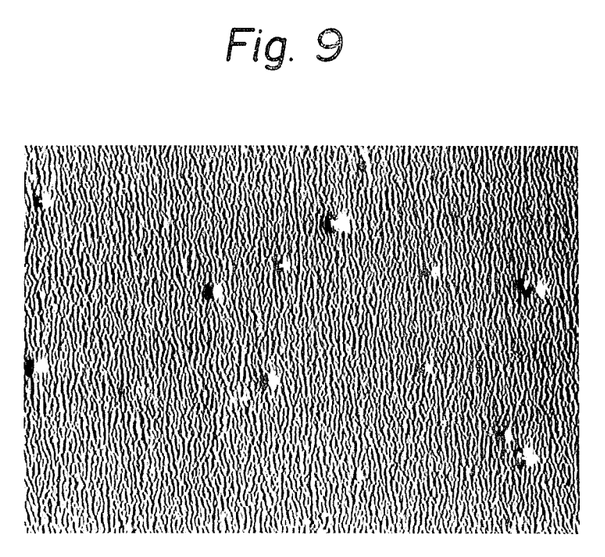
FIG. 9 is a photomicrograph of the laminated film of the present invention in which protrusions are formed on the outer surface of the layer (B) and a discontinuous film of worm-like nodules is formed on the protrusions, obtained by using a differential interference microscope.

The surface structure of this discontinuous covering layer formed of worm-like nodules is as shown in photomicrographs (500 magnification) of FIGS. 4 and 9 obtained by using a differential interference microscope. FIG. 4 shows an embodiment in which this covering layer is formed on the surface having depressions and protrusions, and FIG. 9 shows an embodiment in which this covering layer is formed on the surface on which ordinary protrusions are formed.

The process for the production of the laminated film of the present invention will now be described.

The laminated film of the present invention may be prepared by adopting the technique of coextrusion in the plastic film-manufacturing process, comprising the steps of melting, shaping, biaxial stretching, and heat setting. The starting material from which internal particles are removed as completely as possible is used for the layer (A), and the starting material in which internal particles are positively incorporated is used for the layer (B). These two starting materials are coextruded in the form of a sheet, and the obtained sheet is optionally drawn to form an oriented film. Then, a solution or emulsion containing the above-mentioned components for formation of the discontinuous skin is coated on the outer surface of the layer (A) of the sheet or oriented film and the coated sheet or film is dried and drawn to form a discontinuous skin having a height of 50 to 1,000Å. If the kind and amount of internal particles in the starting material for the layer (B) are appropriately chosen and the depression-forming step is placed in the film-forming process, there can be obtained an outer surface having a plurality of depressions and a plurality of protrusions in a configuration such that at least one protrusion exists within each depression or at least one protrusion exists in the area where two or more depressions are contiguous to each other. The laminated film free of such depressions but having protrusions formed on the flat face may be obtained if the above-mentioned depression-forming step is omitted. As the depression-forming means, there is advantageously adopted a method in which, after the extrusion or first drawing, a volatile polar solvent such as acetone or methanol is coated on the layer (B) to etch the surface. However, the method that can be adopted in the present invention is not limited to this method. The drawn film may be heat-set according to need.

In order to further improve the sliding properties and durability, there may be adopted a method in which a solution or emulsion composed mainly of the above-mentioned lubricant is coated on the outer surface of the layer (B) in the film-forming process and the coated film is dried and drawn.

When a magnetic recording medium is prepared by using the laminated film of the present invention, there may be adopted a method in which a ferromagnetic substance such as Fe, Co, Ni, an alloy thereof, or an alloy of such a metal with other non-magnetic material is deposited in the form of a thin film preferably having a thickness of 500 to 2,000Å by vacuum evaporation, sputtering or plating on the surface, on which the discontinuous skin having a height of 50 to 1,000Å is formed, of the laminated film prepared according to the above-mentioned process. The film is then cut in a predetermined width.

This magnetic recording medium prepared by using the laminated film of the present invention is characterized in that the magnetic surface has good sliding properties and is excellent in electromagnetic performance and in that the non-magnetic surface has good sliding properties and good running properties. Accordingly, this magnetic recording medium is very valuable.

Properties of magnetic tapes referred to in the instant specification are evaluated by repeated recording and reproduction by using a commercially available VTR of the VHS system.

The running characteristics (scratch resistance, sliding properties, and durability) of the tape are evaluated by repeating the running operation for reproduction 500 times and examining the surface of the tape on the running side to check whether or not scratches are formed on the magnetic thin film and the surface on the running side.

The signal/noise (S/N) ratio of the tape is determined by recording a 50% white label signal at an optimum recording current for the tape to be tested and comparing the ratio of the signal to the noise contained in a video demodulation signal at the time of reproduction with that of a commercially available standard tape of the VHS system as 0 dB.

The drop-out characteristic is determined by recording a three-staged step wave signal at an optimum recording current on the magnetic recording tape to be tested, counting with a drop-out counter the number of drop-outs in which the attenuation quantity of the video output at the time of reproduction is larger than 18 dB and the duration time is at least 20 microseconds and calculating a mean value per minute.

The present invention will now be described in detail with reference to the following examples, which by no means limit the scope of the invention.

EXAMPLE 1

Polyethylene terephthalate substantially free of internal particles resulting from the polymerization catalyst residue, as the starting material for the layer (A), and polyethylene terephthalate containing 0.2% by weight of internal particles having a particle size of 1.5μ, which were formed by reaction of the polymerization catalyst residue with polyethylene terephthalate-forming components at the polymerization reaction, as the starting material for the layer (B), were melted and coextruded at a thickness ratio of 1/1. The co-extrudate was drawn at a draw ratio of 2.7 in the longitudinal direction. Acetone was coated on the outer surface of the layer (B) and the coated surface was dried. Then, an aqueous emulsion comprising (A) 0.20% by weight of methyl cellulose, (B) 0.05% by weight of N-β-(aminoethyl)-γ-aminopropylmethyldimethoxysilane (silane coupling agent) and (C) 0.40% by weight of an epoxidized polydimethylsiloxane emulsion (solid content=20% by weight) was coated on the outer surface of the layer (A) in an amount of 20 mg/m² (as the solid content). Then, the coated film was passed through a tenter to effect drying and pre-heating at 115° C. and drawn at a draw ratio of 3.7 in the transverse direction. Then, the film was heat-treated at 200° C. to obtain a biaxially drawn polyester laminated film having a thickness of 12μ, which had a surface A on which a discontinuous skin having a height of 250Å was formed at an area fraction of 50% and a surface B having protrusions existing within depressions and in the areas where depressions were contiguous to one another and having a surface roughness Ra value of 0.014μ at a cut-off value of 0.25 mm.

A thin film of a cobalt-iron alloy having a thickness of 1,500Å was formed on the surface A of the polyester film by vacuum evaporation. Then, the film was cut in the longitudinal direction in a predetermined width to obtain a magnetic tape having properties as shown in Table 1.

EXAMPLE 2

The same aqueous emulsion as used in Example 1 was coated on the outer surface of the layer (A) prepared in Example 1, in an amount of 20 mg/m² (as the solid content), and an aqueous emulsion B comprising (A) 0.40% by weight of an epoxidized polydimethylsiloxane emulsion, (B) 0.050% by weight of a silane coupling agent [N-β-(aminoethyl)-γ-aminopropylmethyldimethoxysilane], and (C) 0.20% by weight of an alkyl phenol type non-ionic surface active agent was coated on the outer surface of the layer (B) prepared in Example 1. Other procedures were repeated in the same manner as described in Example 1 to obtain a magnetic tape having an easily sliding covering layer formed on the outer surface of the layer (B). The properties of this magnetic tape are shown in Table 1.

EXAMPLE 3

The procedures of Example 2 were repeated in the same manner except that an aqueous emulsion B comprising (A) 0.40% by weight of an epoxidized polydimethylsiloxane emulsion, (B) 0.050% by weight of a silane coupling agent [N-β-(aminoethyl)-γ-aminopropylmethyldimethoxysilane]and (C) 0.20% by weight of methyl cellulose was used instead of the aqueous emulsion B used in Example 2. A magnetic tape having a film of worm-like nodules composed of the lubricating components was thus obtained. The properties of this magnetic tape are shown in Table 1.

EXAMPLE 4

Polyethylene terephthalate from which internal particles resulting from the polymerization catalyst residue were removed as completely as possible, as the starting material for the layer (A), and polyethylene terephthalate containing 0.3% by weight of internal particles having a particle size of 1.5μ, which were formed by reaction of polymerization catalyst residues (Ca catalyst and Sb catalyst) with polyethylene terephthalate-forming components at the polymerization reaction, as the starting material for the layer (B), were melted and co-extruded at a thickness ratio of 1/1. The co-extrudate was drawn at a draw ratio of 3 in the longitudinal direction. The same aqueous emulsion as used in Example 1 was coated on the outer surface of the layer (A) in an amount of 20 mg/m² (as the solid content). Then, the film was passed through a tenter, dried and preheated at 115° C., and drawn in the lateral direction at a draw ratio of 3. The film was heat-treated at 200° C. to obtain a biaxially drawn polyester laminated film having a thickness of 12μ, in which a discontinuous skin having a height of 250Å was formed at an area fraction of 50% on the outer surface of the layer (A) and the outer surface of the layer (B) had a surface roughness Ra value of 0.019μ at a cut-off value of 0.25 mm.

A thin film of a cobalt-iron alloy having a thickness of 1,500Å was formed on the surface A of this film by vacuum evaporation. Then, the film was cut in the longitudinal direction in a predetermined width to obtain a magnetic tape having properties as shown in Table 1.

EXAMPLE 5

The same aqueous emulsion as used in Example 1 was coated in an amount of 20 mg/m² (as the solid content on the outer surface of the layer (A) of the film which had been drawn in the longitudinal direction at a draw ratio of 3 in Example 4, and an aqueous emulsion B comprising (A) 0.40% by weight of an epoxidized polydimethylsiloxane emulsion, (B) 0.050% by weight of a silane coupling agent [N-β-(aminoethyl)-γ-aminopropylmethyldimethoxysilane], and (C) 0.20% by weight of an alkylphenol type non-ionic surface active agent was coated on the opposite surface, that is, the outer surface of the layer (B). Other procedures were repeated in the same manner as described in Example 4 to obtain a magnetic tape having properties as shown in Table 1.

EXAMPLE 6

The procedures of Example 5 were repeated in the same manner except that an aqueous emulsion B comprising (A) 0.40% by weight of an epoxidized polydimethylsiloxane emulsion, (B) 0.050% by weight of a silane coupling agent [N-β-(aminoethyl)-γ-aminopropylmethyldimethoxysilane], and (C) 0.20% by weight of methyl cellulose was used instead of the aqueous emulsion B used in Example 5. There was obtained a biaxially drawn polyester laminated film having a thickness of 12μ, in which a discontinuous skin having a height of 250Å was formed on the surface A at an area fraction of 50% and a discontinuous film of worm-like nodules having a surface roughness Ra value of 0.020μ at a cut-off value of 0.25 mm was formed on the surface B. A magnetic tape was prepared from this film in the same manner as described in Example 4. The properties of the magnetic tape are shown in Table 1.

COMPARATIVE EXAMPLE 1

A magnetic tape was prepared in the same manner as described in Example 1 except that after longitudinal drawing, coating of acetone and drying, the coating of the aqueous emulsion was not effected. The properties of the magnetic tape are shown in Table 1.

COMPARAIVE EXAMPLE 2

The procedures of Example 1 were repeated in the same manner except that SiO₂ particles having a particle size of 3μ were incorporated in an amount of 0.03% by weight into the starting material for the layer (B), whereby there was obtained a biaxially drawn polyester laminated film having a thickness of 12μ, in which a discontinuous skin having a height of 250Å was formed on the surface A at an area fraction of 50% and the surface B had a surface roughness Ra value of 0.050μ at a cut-off value of 0.25 mm and comprised depressions and protrusions formed thereon in such a configuration that protrusions existed within depressions and protrusions existed in the areas where depressions were contiguous to one another. A thin layer of a cobalt-iron alloy having a thickness of 1,500Å was formed on the surface A of the film by vacuum evaporation, and the film was cut in the longitudinal direction in a predetermined width to obtain a magnetic tape having properties as shown in Table 1. It was found that the surface B was too coarse and the S/N ratio was reduced.

COMPARATIVE EXAMPLE 3

The procedures of Example 1 were repeated in the same manner except that 5/6 of the starting material for the layer (B) was replaced by the starting material for the layer (A) to reduce the amount of the internal particles in the layer (B), whereby there was obtained a biaxially drawn polyester laminated film having a thickness of 12 μ, in which a discontinuous skin having a height of 250Å was formed at an area fraction of 50% on the surface A and the surface B had a surface roughness Ra value of 0.004μ at a cut-off value of 0.25 mm and comprised protrusions existing within depressions and existing in the areas where depressions were contiguous to one another.

A magnetic tape was prepared in the same manner as in Example 1 by using the so-prepared base film. The properties of the magnetic tape are shown in Table 1.

COMPARATIVE EXAMPLE 4

The procedures of Example 1 were repeated in the same manner except that the concentration of methyl cellulose was changed to 0.4% by weight, whereby there was obtained a biaxially drawn polyester laminated film having a thickness of 12μ, in which a discontinuous skin having a height of 1,100Å was formed at an area fraction of 60% on the outer surface of the layer (A) and the outer surface of the layer (B) had a surface roughness value Ra value of 0.014μ at a cut-off value of 0.25 mm and comprised protrusions existing within depressions and in the areas where depressions were contiguous to each other.

A magnetic tape was prepared in the same manner as in Example 1 by using the so-obtained base film. The properties of the magnetic tape are shown in Table 1.

TABLE 1

| | Surface Structure of Base Film | | Running Property (scratch resistance) | | Magnetic Characteristics | |
|---|---|---|---|---|---|---|
| | Height (Å) of Skin of Layer (A) | Surface Roughness Ra (μ) of Layer (B) | Magnetic Surface | Non-Magnetic Surface | S/N Ratio (dB) | Number of Drop-Outs per Minute |
| Example 1 | 250 | 0.014 | B | B | +13 | 20 |
| Example 2 | 250 | 0.014 | B | B-A | +13 | 20 |
| Example 3 | 250 | 0.015 | B | B-A | +13 | 20 |
| Example 4 | 250 | 0.019 | B | B-A | +13 | 20 |
| Example 5 | 250 | 0.019 | B | A | +13 | 20 |
| Example 6 | 250 | 0.020 | B | A | +13 | 20 |
| Comparative Example 1 | 20 | 0.014 | C | B | +2 | 250 |
| Comparative Example 2 | 250 | 0.050 | B | A | −5 | 40 |
| Comparative Example 3 | 250 | 0.004 | B | C | +13 | 180 |
| Comparative Example 4 | 1,100 | 0.014 | A | B | −30 | 400 |

Note
The scratch resistance was evaluated according to the following rating.
A: no scratches were observed
B: slight formation of very small scratches were observed
C: prominent formation of scratches were observed As is apparent from the results shown in Table 1, in a magnetic recording medium obtained by forming a thin film of a ferromagnetic substance on the laminated film of the present invention comprising a layer (A) of a thermoplastic resin and a layer (B) of a fine particle-containing thermoplastic resin, in which a discontinuous skin having a height of 50 to 1,000Å is formed on the outer surface of the layer (A) and the surface roughness Ra value of the layer (B) is 0.005 to 0.040μ at a cut-off value of 0.25 mm, good running properties are attained in actual operation, and the electromagnetic performance is very excellent. Furthermore, if a covering layer composed mainly of a lubricant is formed on the outer surface of the layer (B), the running properties of the non-magnetic surface are further improved. When a ferromagnetic thin layer is formed on the laminated film of the present invention, an excellent magnetic recording medium can be obtained. Accordingly, the laminated film of the present invention is very valuable as a base film of a magnetic recording material, especially a video tape.

We claim:

1. A laminated film for use in high-density, metallized magnetic recording media comprising (A) a layer composed of a thermoplastic resin and (B) a layer of a thermoplastic resin containing fine particles therein, wherein the outer surface of the layer (A) has a discontinuous skin having a height of 50 to 1,000Å, said discontinuous skin comprising a silicone resin, a silane coupling agent which is an organic silicon monomer having at least two different reactive groups in the molecule, and a water-soluble polymer having a molecular weight of from 10,000 to 2,000,000, wherein the ratio by weight of silicone resin/silane coupling agent/water-soluble polymer is in the range of (10–50)/(5–150)/(10–200); wherein the outer surface of the layer (B) has a roughness, expressed as the Ra value, of 0.005 to 0.040μ.

2. A laminated film as set forth in claim 1, wherein the height of the discontinuous skin is 80 to 300Å.

3. A laminated film as set forth in claim 1, wherein the roughness, expressed as the Ra value, of the outer surface of the layer (B) is 0.005 to 0.030μ.

4. A laminated film as set forth in claim 1, wherein the silane coupling agent is a mono- or di-organoalkoxysilane.

5. A laminated film as set forth in claim 1, wherein one of at least two different groups of the silane coupling agent is a group selected from methoxy, ethoxy and silanol groups and the other reactive group is a group selected from vinyl, epoxy, methacrylic, amino and mercapto groups.

6. A laminated film as set forth in claim 1, wherein the silane coupling agent is an aminosilane type compound.

7. A laminated film as set forth in claim 1, wherein the silane coupling agent is at least one organic silane compound selected from the group consisting of vinyltrichlorosilane, vinyltriethoxysilane, vinyltris($\beta$-methoxyethoxy)silane, $\gamma$-methacryloxypropyltrimethoxysilane, N-$\beta$-(aminoethyl)-$\gamma$-aminopropyltrimethoxysilane, N-$\beta$-(aminoethyl)-$\gamma$-aminopropylmethyldimethoxysilane, $\gamma$-chloropropyltrimethoxysilane, $\gamma$-mercaptopropyltrimethoxysilane, and $\gamma$-aminopropyltriethoxysilane.

8. A laminated film as set forth in claim 1, wherein the molecular weight of the water-soluble polymer is 100,000 to 1,000,000.

9. A laminated film as set forth in claim 1, wherein the water-soluble polymer is at least one member selected from the group consisting of polyvinyl alcohol, tragacanth gum, gum arabic, casein, gelatin, methyl cellulose, hydroxyethyl cellulose, and carboxymethyl cellulose.

10. A laminated film as set forth in claim 1, wherein the water-soluble polymer is at least one member selected from the group consisting of methyl cellulose, hydroxyethyl cellulose and carboxymethyl cellulose.

11. A laminated film as set forth in claim 1, wherein each of the thermoplastic resin layers (A) and (B) is a biaxially oriented polyester film.

12. A laminated film as set forth in claim 1, wherein the outer surface of the layer (B) has a plurality of depressions and a plurality of protrusions which are formed in a configuration such that at least one protrusion exists within each depression or at least one protrusion exists in the area where two or more depressions are contiguous to each other.

13. A laminated film as set forth in claim 12, wherein the area fraction of said depressions is in the range of from $1 \times 10^{-3}$ to $6 \times 10^{-1}$.

14. A laminated film as set forth in claim 1, which further comprises a ferro-magnetic metal thin film formed on the discontinuous skin.

15. A laminated film as set forth in claim 14, wherein the ferromagnetic metal thin film is a vacuum-deposited ferromagnetic metal thin film.

16. A laminated film as set forth in claim 14, wherein the ferromagnetic metal is at least one member selected from Fe, Co, Ni and alloys thereof.

17. A laminated film as set forth in claim 1, wherein the silicone resin is a polysiloxane having a molecular weight of 30,000 to 300,000.

18. A laminated film as set forth in claim 1 or 17, wherein the silicone resin is a compound which is represented by the following general formula:

wherein $R_1$ is $CH_3$, $C_6H_5$, or H, $R_2$ is $CH_3$, $C_6H_5$, H, an epoxy group, an amino group, or a hydroxyl group, and n is a number of from 100 to 7,000, and has functional terminal groups selected from epoxy, amino, and hydroxyl groups at the ends thereof.

19. A laminated film as set forth in claim 1, wherein each of the thermoplastic resins in the layer (A) and the layer (B) at least one member selected from the group consisting of polyesters, polyamides, polycarbonates and polypropylenes.

20. A laminated film as set forth in claim 1, wherein each of the thermoplastic resins in the layer (A) and the layer (B) is a polyester.

21. A laminated film as set forth in claim 19 or 20, wherein the polyester is at least one member selected from the group consisting of polyethylene terephthalate, polytetramethylene terephthalate, poly-1,4-cyclohexylenedimethylene terephthalate, polyethylene-2,6-naphthalene dicarboxylate, polyethylene-p-hydroxybenzoate and copolymers thereof.

22. A laminated film as set forth in claim 19 or 20, wherein the polyester is polyethylene terephthalate.

23. A laminated film as set forth in claim 1, which further comprises a covering layer (C) comprising a lubricant, which is formed on the outer surface of the layer (B).

24. A laminated film as set forth in claim 23, wherein the covering layer (C) is a continuous film layer comprising a silicone resin, a surface active agent and a silane coupling agent wherein the silicone resin/surface active agent/silane coupling agent weight ratios are in the range of (10–100)/(5–20)/(5–100), respectively.

25. A laminated film as set forth in claim 24, wherein the covering layer (c) further comprises a wax, wherein the respective weight ratio of said wax is less than or equal to 200.

26. A laminated film as set forth in claim 23, wherein the covering layer (c) is a discontinuous film formed of worm-like nodules, which comprises a silicone resin, a silane coupling agent and a water-soluble polymer, wherein the silicone resin/silane coupling agent/water-soluble polymer weight ratios are in the range of (10–100)/(5–100)/(10–200), respectively.

27. A laminated film as set forth in claim 26, wherein the covering layer (c) further comprises a wax, wherein the respective weight ratio of said wax is less than or equal to 200.

* * * * *